United States Patent [19]

Hunt

[11] 4,209,691

[45] Jun. 24, 1980

[54] NIGHT VISION SYSTEM COMPRISING A LIGHT SOURCE AND IMAGE INTENSIFIER POWERED IN ALTERATION

[75] Inventor: Geoffrey H. Hunt, Farnham, England

[73] Assignee: The Secretary of State for Defence in Her Britannic Majesty's Government of the United Kingdom of Great Britain and Northern Ireland, London, England

[21] Appl. No.: 884,073

[22] Filed: Mar. 6, 1978

[30] Foreign Application Priority Data

Mar. 8, 1977 [GB] United Kingdom ............... 9679/77

[51] Int. Cl.² ........................................... H01J 31/50
[52] U.S. Cl. ............................................. 250/213 VT
[58] Field of Search ............ 250/213 VT, 213 R, 230, 250/233; 356/5; 313/94

[56] References Cited

U.S. PATENT DOCUMENTS

| | | | |
|---|---|---|---|
| 3,733,492 | 5/1973 | Hagar | 250/213 VT |
| 3,803,407 | 4/1974 | Anderson | 250/213 VT |
| 3,902,803 | 9/1975 | Lego, Jr. | 356/5 |
| 3,947,119 | 3/1976 | Bamberg et al. | 356/5 |

FOREIGN PATENT DOCUMENTS 996555  6/1965  United Kingdom ............. 250/213 VT Primary Examiner—David C. Nelms
Assistant Examiner—Edward P. Westin
Attorney, Agent, or Firm—Pollock, Vande Sande and Priddy

[57] ABSTRACT

A night vision system for use in an environment having at least one observer using artificial light means (lamp lit instruments, torch, etc.) and at least one observer using a light intensifying direct vision device has a power supply which supplies pulses of power to the artificial light device and which switches off the light intensifying direct vision device in synchronism with the pulses.

2 Claims, 4 Drawing Figures

NIGHT VISION SYSTEM COMPRISING A LIGHT SOURCE AND IMAGE INTENSIFIER POWERED IN ALTERATION

The present invention relates to night vision systems.

The best known night vision systems make use of aritificial light, which is almost invariably electrically generated, either to illuminate an object, such as a car or aircraft instrument to be observed, or to cast a beam of light from, for example a torch or headlight, onto an object to be viewed. Recent advances in optical and electronic technology have resulted in the development of a new type of night vision device known as a light intensifying unit. In a typical light intensifying unit light from an object to be viewed is focused by a lens on to a photo cathode, resulting in electrons being released from the cathode. Behind the cathode is a channel plate, which is a plate having a very large number of passages therethrough. A potential difference is maintained between the photo cathode and the channel plate, and a potential difference is maintained between the two faces of the channel plate. Behind the channel plate is a phosphor screen, which is also maintained at a potential difference relative to the rear face of the channel plate. Due to the potential differences, electrons released from the photo cathode are accelerated towards the channel plate and into passages in the channel plate where they impinge on the sides of the passages releasing more electrons. The released electrons re-impinge, releasing yet more electrons. The electrons leaving the channel plate impinge on the phosphor screen releasing an image of the object to be viewed. This image, which is inverted, is viewed through a converter, which reorientates the image, and an eye piece. Using such a light intensifying unit, objects can be viewed in conditions of almost total darkness, the amount of light intensification being a function of the design of the particular light intensifying unit and the potential differences applied. Light intensifying units have been made sufficiently small for an observer to wear them as a form of goggles. The use of a light intensifying unit allows an observer to view a scene at night without revealing his own position, as he would have to do if he was using a light source such as a torch or searchlight. The observer can also scan over a large area, using normal head movements, much more easily than he could using an artificial light source. One of the disadvantages of a light intensifying unit is that the presence anywhere in the field of view of a bright light source severely reduces the efficacity of the unit. There are many environments, such as in an aircraft cockpit or on a ship's bridge, where one observer, such an aircraft's pilot, may wish to observe the outside world through a night vision unit, while another observer, such as an aircraft's navigator, may wish to study instruments which are illuminated by artificial light or to read a map by the use of a torch. In such environments the presence of the artificial light in his vicinity is a severe disadvantage to the observer using the light intensifying unit.

According to the present invention a night vision system including artificial light means and light intensifying direct vision means has a power supply arranged to supply pulse of power to illuminate the artificial light means and to switch off the light intensifying direct vision means while the artificial light means are illuminated.

The pulses are preferably supplied at a frequency greater than the flicker frequency, that is the frequency, usually about 50 to 60 Hz, below which the human eye can discriminate the non-continuity of a light source. The intensity of each pulse of artificial light should be such, relative to the frequency of the pulses and the duration of each pulse, that the mean artificial light intensity is that which a relevant observer would see as a continuous illumination intensity.

The light intensifying direct vision means may be switched off by discontinuing one of the potential differences therein, or by the setting up of an electrostatic field adjacent to the means to divert the flow of electrons emitted from the photo cathode.

In the simplest form of the invention the light intensifying direct vision means will be switched off over the full duration of each power pulse. However, in certain environments, such as in an aircraft cockpit, a user, such as a pilot, of the light intensifying direct vision means may wish, from time to time, to refer to instruments within the aircraft cockpit. To enable him to view these instruments a slight residual amount of illumination may be retained during the non-pulsed periods of illumination of the instruments, or the pulses of power supplied to the artificial light means may be made of marginally greater duration than the duration of the switching off of the light intensifying direct vision means.

One embodiment of the invention will now be described, by way of example only, with reference to the accompanying diagrammatic drawings, of which:

Figure 1:
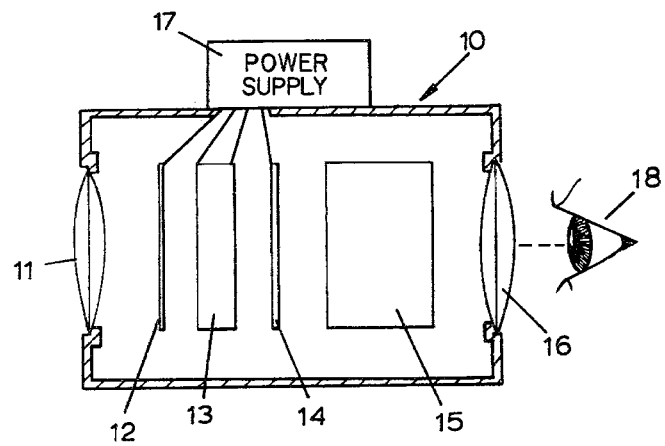
FIG. 1 shows a typical light intensifying unit.
Figure 2:
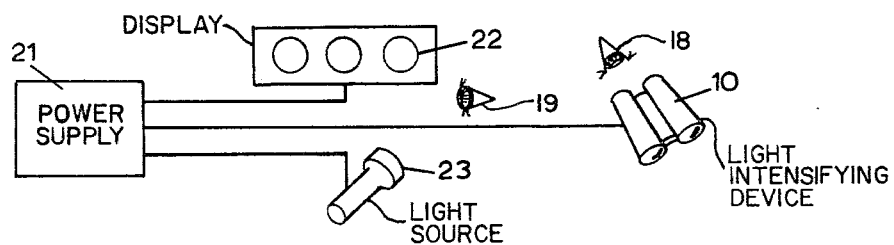
FIG. 2 shows a night vision system according to the invention.

A typical light intensifying unit shown generally at 10 in FIG. 1 has a lens 11 which focuses light from an external object (not shown) on to a photo cathode 12, behind which is a channel plate 13, a phosphor screen 14, a converter 15, and an eye piece 16. A power supply unit 17, which may be a self-contained unit attached to the light intensifying unit 10 or may be from an external source, is connected to the photo cathode 12, the front and rear faces of the channel plate 13, and to the phosphor screen 14, maintaining potential differences between these units. Typical potential differences for a unit of this type are 1 kilovolt between the photo cathode 12 and the front face of the channel plate 13, 400 to 1200 volts across the channel plate 13, and 4 kilovolts between the rear face of the channel plate 13 and the phosphor screen 14, although of course these voltages will be varied depending on the amount of outside illumination present. In use light from the lens 11 is focused on to the photo cathode 12 which releases electrons. The electrons, in passage through passages in the channel plate 13 release more electrons which impinge on the phosphor screen 14 and produce a visible image. The image on the phosphor screen 14, which is inverted relative to the object being viewed, is observed by an eye 18 of an observer through a converter 15, which reorientates the image, and the eye piece 16. A night vision system (FIG. 2) suitable for use in an aircraft cockpit, in which a first observer (identified by an eye 19) is using artificial light means at the same time as a second observer (indicated by an eye 18) is using a light intensifying unit such as that shown in FIG. 1, has a power supply 21. The power supply 21 produces pulses of power which are passed to artificial light units, such as light bulbs situated in an instrument display 22, a torch 23, or both. The power supply 21 also passes power to the light intensifying unit 10 in such form as to ensure that the light intensifying characteristics of the unit 10 are switched off in synchronism with the switching on of the artificial light means. The frequency of the pulsing should be greater than the flicker frequency, that is greater than 50 to 60 Hz.

Figure 3:
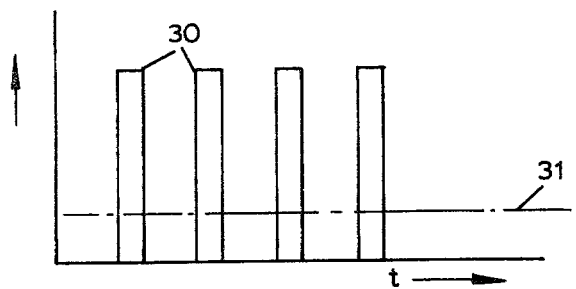
FIG. 3 shows a pulsing pattern.
Figure 4:
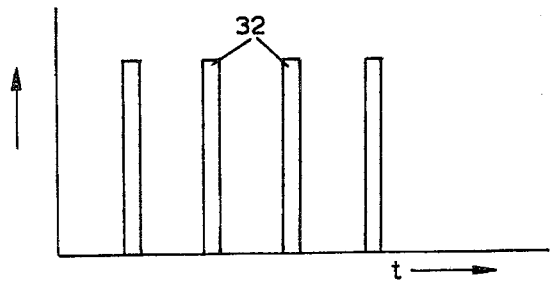
FIG. 4 shows an alternative pulsing pattern for the light intensifying unit.

A typical pulsing pattern is shown in FIG. 3, which shows illumination plotted against time. The level of illumination in each pulse 30 is such that the mean level of illumination 31 is of the order which the user of the artificial light means would require from a steady source. The duration of the periods during which the light intensifying means are switched off may be identical to the periods during which the artificial light means are switched on, as in FIG. 3, or may be slightly less, as indicated by comparison of FIG. 3 with FIG. 4, where the pulses 32 indicate periods when the light intensifying unit 10 is switched off. In this case the difference between the durations of the pulses 30, 32 should be such as to to leave a mean level of illumination apparent to the observer using the light intensifying unit sufficient to enable him to read, for example, the instruments 22 without distorting his view of the outside world.

Alternative methods of allowing the observer using the light intensifying means to see also objects illuminated by the artifical light means are the use of light intensifying means on one eye only, or the use of an optical combiner in the intensifying unit to give an effect analogous to a "Head Up Display" as commonly used in aircraft.

What I claim is:

1. A night vision system for use by at least a first observer for viewing objects in the near field by means of artificial light and for use by a second observer for viewing objects in the far field by means of a light intensifying direct vision device which would have its efficacity reduced by the presence of artificial light, said system comprising artificial light producing means for use by said first observer, light intensifying direct vision means for use by said second observer, and means for rendering said artificial light producing means and said light intensifying direct vision means respectively operative substantially during alternate intervals of time, said last-named means comprising power supply means coupled to both said artificial light producing means and to said light intensifying direct vision means, said power supply means being operative to supply a train of spaced power pulses to said artificial light producing means at a repetition rate greater than the flicker frequency, said artificial light producing means being responsive to the presence and absence of said power pulses whereby said artificial light producing means is illuminated in response to the occurrence of each such power pulse and is extinguished in response to the termination of each such power pulse, and said light intensifying direct vision means including means responsive to the presence and absence of said pulses of power for rendering said light intensifying direct vision means inoperative when said artificial light producing means is illuminated and for rendering said light intensifying direct vision means operative when said artifical light producing means is extinguished, said light intensifying direct vision means being rendered operative marginally before the termination of each power pulse supplied to said artificial light producing means.

2. A night vision system for use by at least a first observer for viewing objects in the near field by means of artificial light, and for use by a second observer for viewing objects in the far field by means of a light intensifying direct vision device which would have its efficacity reduced by the presence of artificial light, said system comprising artificial light producing means for use by said first observer, light intensifying direct vision means for use by said second observer, and means for rendering said artificial light producing means and said light intensifying direct vision means respectively operative substantially during alternate intervals of time, said last-named means comprising power supply means coupled to both said artificial light producing means and to said light intensifying direct vision means, said power supply means being operative to supply a train of spaced power pulses to said artificial light producing means at a repetition rate greater than the flicker frequency, said artificial light producing means being responsive to the presence and absence of said power pulses whereby said artificial light producing means is illuminated in response to the occurrence of each such power pulse and is extinguished in response to the termination of each such power pulse, and said light intensifying direct vision means including means responsive to the presence and absence of said pulses of power for rendering said light intensifying direct vision means inoperative when said artificial light producing means is illuminated and for rendering said light intensifying direct vision means operative when said artificial light producing means is extinguished, said light intensifying direct vision means being rendered operative during spaced intervals of time which are substantially identical in duration to the spaced intervals of time during which said artificial light producing means is extinguished, and said light intensifying direct vision means being rendered inoperative during intervening spaced intervals of time which are substantially identical in duration to the intervening spaced intervals of time during which said artificial light producing means is illuminated.

* * * * *